R. STOCK.
PROCESS OF MAKING ANIMAL FOOD.
APPLICATION FILED SEPT. 22, 1910.
991,178.
Patented May 2, 1911.
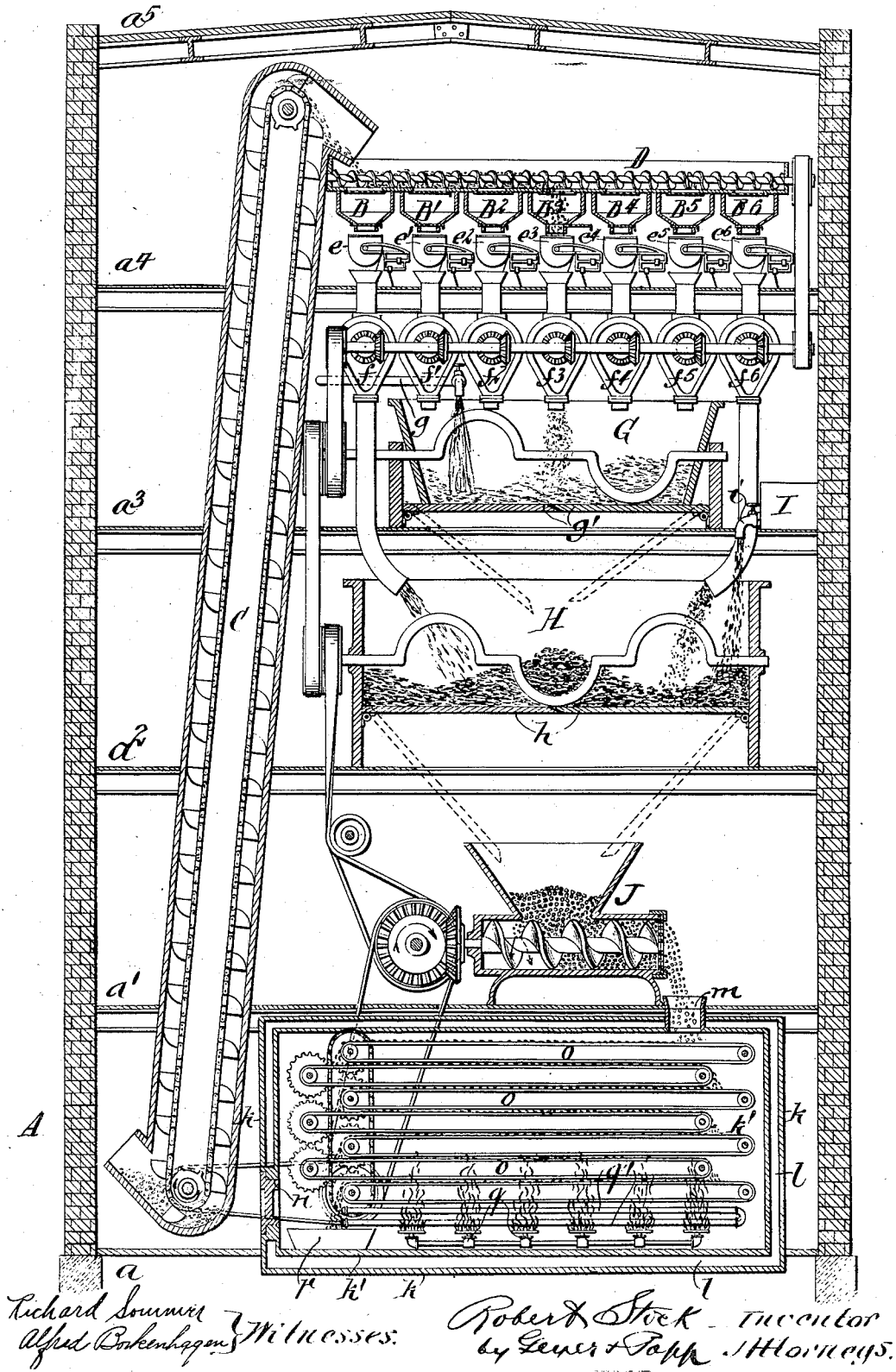

UNITED STATES PATENT OFFICE.

ROBERT STOCK, OF SILVER CREEK, NEW YORK.

PROCESS OF MAKING ANIMAL FOOD.

991,178.  Specification of Letters Patent.  Patented May 2, 1911.

Application filed September 22, 1910. Serial No. 583,177.

*To all whom it may concern:*

Be it known that I, ROBERT STOCK, a citizen of the United States, residing at Silver Creek, in the county of Chautauqua and State of New York, have invented new and useful Improvements in Processes of Making Animal Food, of which the following is a specification.

This invention relates to a process for producing a food for animals and particularly for horses and cattle.

The object of the process of this invention is the production of a food for this purpose which is richer in nutritive value than the foods heretofore in use, which is predigested so that it is easily assimilated by the digestive system, and which is sterilized so that it is free from bacteria and other elements which cause colic and other ailments.

In this process of producing animal food a plurality of different grains such as oats, wheat, rye, barley and malt are first separately ground and then mixed with water and yeast in a primary mixing machine to produce a dough. After these ground grains, water and yeast have been thus mixed the same are permitted to ferment about four hours. After this mass has fermented, previously ground flax seed and corn and also a quantity of molasses are added to the same and mixed therewith to produce a dough of medium hardness and then this new mass is allowed to ferment about twenty minutes. This second fermentation having been completed the dough mass is now divided into small pieces by any suitable means and then dried for a period of about twenty-five minutes at a temperature of about three hundred and fifty degrees, Fahrenheit, for the purpose of thoroughly sterilizing the product. The same is now ready for consumption and may be dispensed to the trade either loose or in packages. The animal food produced by this method will not get moist nor musty when exposed to the ordinary temperature.

Various means may be employed for practicing my process but preferably the apparatus which is shown in the accompanying drawing which is a vertical section of the mill equipped for practicing my invention.

In this drawing A represents the walls, $a$, $a^1$, $a^2$, $a^3$, $a^4$ the several floors and $a^5$ the roof of a building which houses the apparatus above referred to.

In the uppermost story of the building above the floor $a^4$ are arranged a plurality of storage bins or hoppers B, $B^1$, $B^2$, $B^3$, $B^4$, $B^5$, $B^6$ in which the different grains such as flax seed or linseed, oats, wheat, rye, barley, malt and corn are stored. These grains are elevated from the ground floor to the uppermost story by means of an elevator C such as shown or of other suitable construction and then delivered from the upper end of the elevator to the respective bin by a horizontal conveyer D which may be of the screw type, as shown, or of any other suitable form. Below the several grain hoppers or bins are arranged a plurality of grain weighing scales $e$, $e^1$, $e^2$, $e^3$, $e^4$, $e^5$, $e^6$, each scale being arranged to receive the grain from one of the hoppers and discharge the same into one of the grinding machines $f$, $f^1$, $f^2$, $f^3$, $f^4$, $f^5$, $f^6$, having their inlets arranged respectively below the outlets of said scales and adapted to receive the particular grains therefrom and grind or pulverize them individually.

The ground oats, wheat, rye, barley and malt which escapes through the outlets of the grinding machines $B^1$–$B^5$ are discharged into the receptacle G of a primary mixing machine which is arranged on the fourth floor of the building and which may be of any suitable construction. After the last mentioned ground grains have been delivered into the receptacle there are added to the same water of a comparatively warm temperature by means of a pipe $g$ and also a quantity of yeast and then the mass is thoroughly mixed to form a dough. This dough is then permitted to ferment, preferably in the receptacle G, for a period of about four hours. After such fermentation the dough mass is discharged from the primary mixing machine through the movable bottom $g^1$ thereof into the receptacle H of a secondary mixing machine. While the dough is in the latter there are added to the same a quantity of the oil meal produced by grinding of flaxseed or linseed and corn meal produced by grinding corn, these meals being conducted from the outlets of the grinding machines $f$, $f^6$ into the secondary mixing machine. A quantity of molasses is also added to the same, this molasses being delivered from a tank I by a nozzle $i$ into the secondary mixing chamber. After being thoroughly mixed in the latter, so that it is comparatively hard the dough mass containing the added ingredients and while still in the secondary mixing machine is permitted to ferment again for a period of about twenty minutes after which it is discharged through the movable bottom $h$ of the secondary mixing chamber into a dividing machine J which operates to cut or divide the dough into small particles. From the outlet of this dividing machine these small particles of dough are delivered into an oven in which the same are dried and sterilized at a temperature of three hundred and fifty degrees, Fahrenheit, for a period of about twenty five minutes. This oven may be variously constructed but preferably comprises a casing composed of inner and outer shells $k$, $k^1$ which are separated from each other to form an intervening air space $l$, and having an inlet $m$ in its top for receiving the dough particles to be dried and an outlet $n$ near its bottom through which the dried material may be removed from the oven, a plurality of superposed horizontally movable endless belts or aprons $o$ arranged within the casing and moving alternately in opposite directions, and the uppermost apron receiving the material from the dividing machine and each apron delivering the material upon the next lower one which moves in an opposite direction, while the lowermost apron delivers the dried material into a receptacle $p$, or elsewhere, and a heating means such as gas burners $q$ or steam coils $q^1$ arranged in the casing below the aprons. After the material has been dried and sterilized in the oven the same may be packed ready for use.

In its finished condition this animal food comprises about seventy four per cent. of grains, eight per cent. of water, fifteen per cent. of molasses and three per cent. of yeast. It is easily digested by reason of the thorough sterilization of the same, it is relished by animals on account of the greater amount of sugar which it contains, and the thorough elimination of all disease breeding germs reduces the possibility of colic or other digestive disorders to a minimum, thereby rendering the same preferable to the animal foods heretofore used.

I claim as my invention:

1. The herein described process of producing animal food consisting in mixing a quantity of ground grain with water and yeast to form a dough, and permitting the same to ferment, a comparatively long time then adding a further quantity of ground grain and also a quantity of molasses to said dough and again permitting the same to ferment a comparatively short time, then dividing the dough into small particles, and then drying said particles.

2. The herein described process of producing animal food consisting in mixing a quantity of ground grain with water and yeast to form a dough and permitting the same to ferment about four hours, then adding a further quantity of ground grain and also a quantity of molasses to said dough and again permitting the same to ferment about twenty minutes, then dividing the dough into small particles, and then drying said particles at a temperature sufficiently high to sterilize the same.

3. The herein described process of producing animal food consisting in mixing a quantity of ground grain with water and yeast to form a dough and permitting the same to ferment about four hours, then adding a further quantity of ground grain and also a quantity of molasses to said dough and again permitting the same to ferment about twenty minutes, then dividing the dough into small particles, and then drying said particles.

4. The herein described process of producing animal food which consists in mixing ground oats, wheat, rye, barley and malt with water and yeast to form a dough and permitting the same to ferment about four hours, then adding oil meal and corn meal and molasses to said dough and again permitting the same to ferment about twenty minutes, then dividing the dough into small particles, and then drying said particles.

5. The herein described process of producing animal food which consists in mixing ground oats, wheat, rye, barley and malt with water and yeast to form a dough and permitting the same to ferment about four hours, then adding oil meal and corn meal and molasses to said dough and again permitting the same to ferment about twenty minutes, then dividing the dough into small particles, and then drying said particles, said mixture comprising approximately seventy four per cent. of grain, eight per cent. of water, fifteen per cent. of molasses and three per cent. of yeast.

Witness my hand this 17th day of September, 1910.

ROBERT STOCK.

Witnesses:
THEO. L. POPP,
ANNA HEIGIS.